United States Patent
Mehas et al.

(10) Patent No.: US 11,216,601 B2
(45) Date of Patent: Jan. 4, 2022

(54) DIRECTED MAGNETIC FIELD COIL DESIGN

(71) Applicant: Integrated Device Technology, Inc., San Jose, CA (US)

(72) Inventors: Gustavo Mehas, Mercer Island, WA (US); Tao Qi, San Diego, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 418 days.

(21) Appl. No.: 16/132,158

(22) Filed: Sep. 14, 2018

(65) Prior Publication Data

US 2019/0026411 A1    Jan. 24, 2019

Related U.S. Application Data

(63) Continuation-in-part of application No. 16/012,682, filed on Jun. 19, 2018, now abandoned.

(60) Provisional application No. 62/559,477, filed on Sep. 15, 2017, provisional application No. 62/522,026, filed on Jun. 19, 2017.

(51) Int. Cl.
| | |
|---|---|
| *H01F 38/14* | (2006.01) |
| *G06F 30/20* | (2020.01) |
| *H04B 5/00* | (2006.01) |
| *H02J 50/10* | (2016.01) |
| *H01F 27/255* | (2006.01) |
| *H01F 27/36* | (2006.01) |
| *H01F 27/24* | (2006.01) |
| *G06F 111/10* | (2020.01) |
| *G06F 119/06* | (2020.01) |

(52) U.S. Cl.
CPC .......... *G06F 30/20* (2020.01); *H01F 27/24* (2013.01); *H01F 27/255* (2013.01); *H01F 27/36* (2013.01); *H01F 38/14* (2013.01); *H02J 50/10* (2016.02); *H04B 5/0031* (2013.01); *H04B 5/0037* (2013.01); *H04B 5/0087* (2013.01); *G06F 2111/10* (2020.01); *G06F 2119/06* (2020.01); *H01F 2038/143* (2013.01)

(58) Field of Classification Search
CPC .. G06F 30/20; G06F 2111/10; G06F 2119/06; H01F 27/36; H01F 27/255; H01F 38/14; H04B 5/0031; H04B 5/0087; H04B 5/0037; H02J 50/10
See application file for complete search history.

(56) References Cited

U.S. PATENT DOCUMENTS 4,590,427 A * 5/1986 Fukushima ...... G01R 33/34053
                                                              324/311

* cited by examiner

*Primary Examiner* — Tuyen T Nguyen
(74) *Attorney, Agent, or Firm* — Haynes and Boone, LLP

(57) ABSTRACT

In accordance with aspects of the present invention, a coil arrangement is presented. A coil arrangement according to some embodiments includes at least one coil positioned to provide a magnetic field in a first area and configured to reduce the magnetic field in a second area outside of the first area. In some embodiments, the at least one coil includes a bent solenoid oriented in the X-Y plane, the bent solenoid localizing magnetic field flux at ends of the bent solenoid. In some embodiments, the bent solenoid can include end caps to further direct the magnetic flux. In some embodiments, the at least one coil includes a flattened solenoid with end caps to direct the magnetic flux. In some embodiments, the coil arrangement is a configuration of multiple coils.

9 Claims, 15 Drawing Sheets

Figure 8B
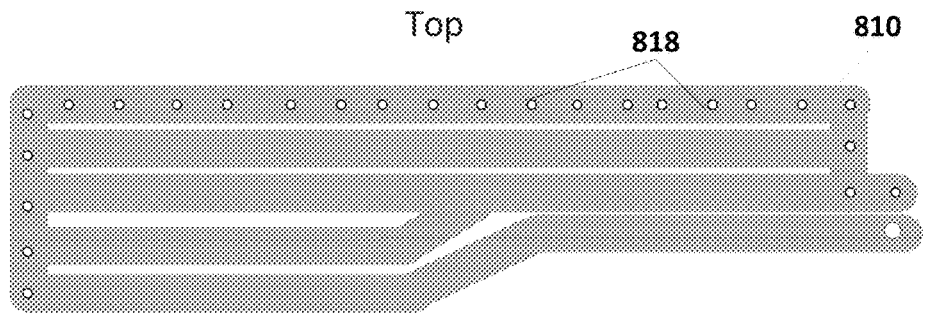
Figure 8C
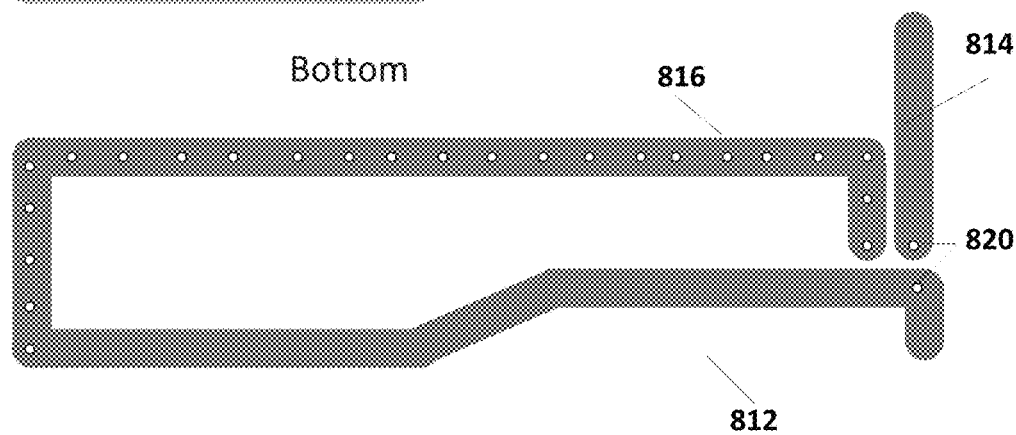
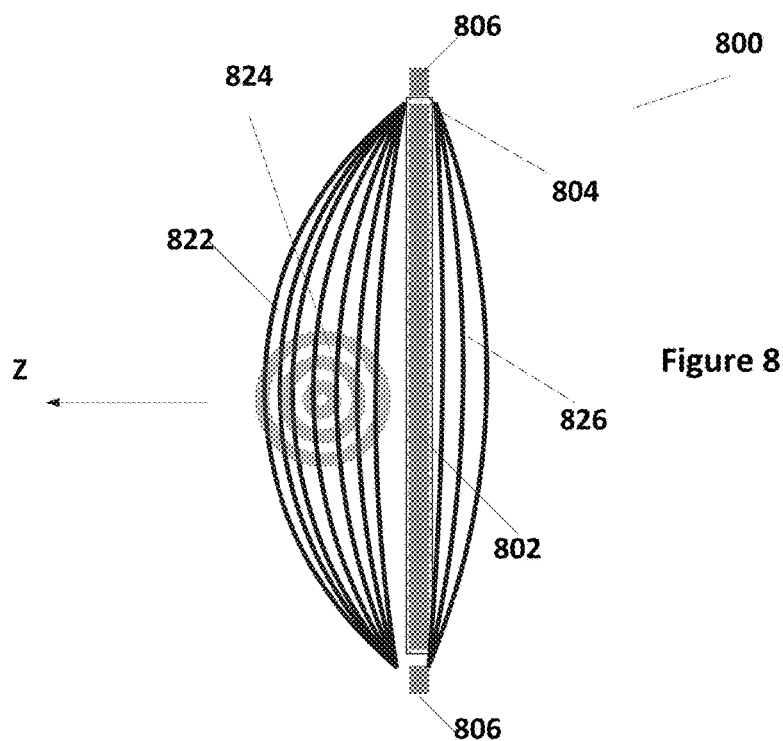
Figure 8D

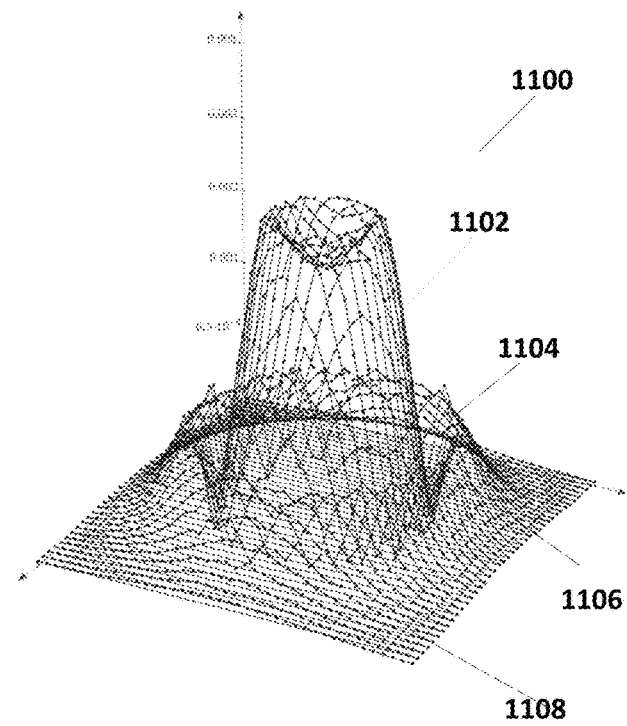
Figure 11A
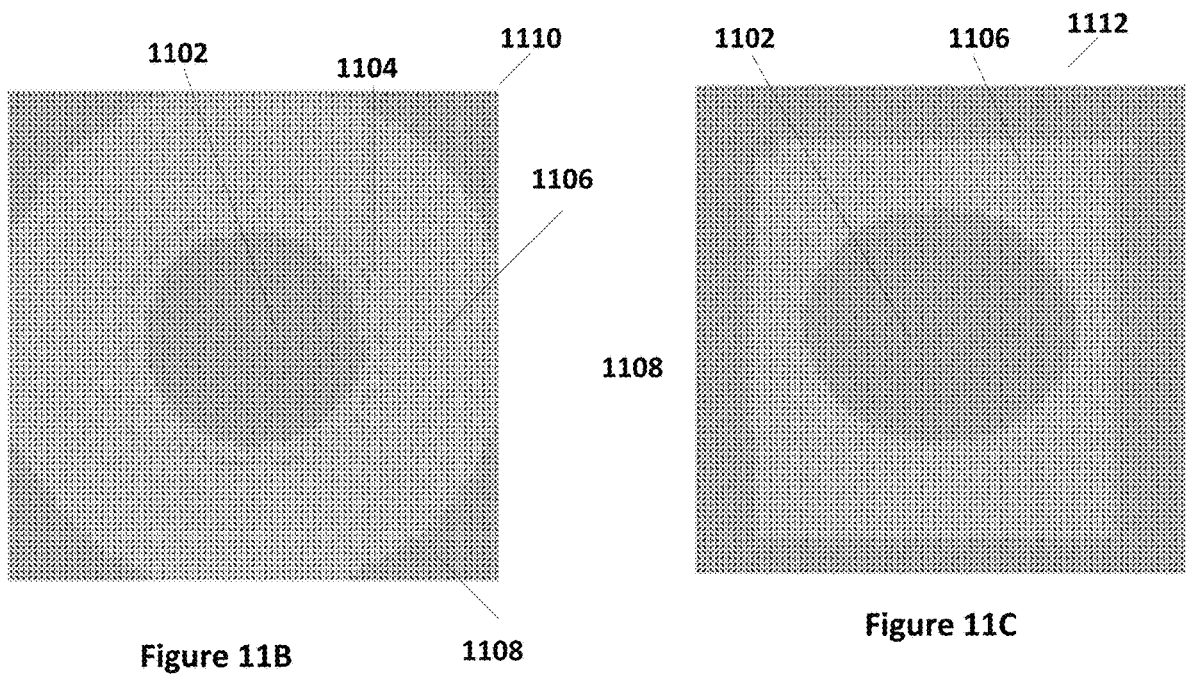
Figure 11B
Figure 11C

DIRECTED MAGNETIC FIELD COIL DESIGN

RELATED APPLICATIONS

The present disclosure claims the benefit of U.S. Provisional Application No. 62/559,477, filed Sep. 15, 2017, and is a continuation-in-part of U.S. application Ser. No. 16/012,682, filed Jun. 19, 2018, which claims the benefit of U.S. Provisional Application No. 62/522,026, filed Jun. 19, 2017, all of which are herein incorporated by reference in their entirety.

TECHNICAL FIELD

Embodiments of the present invention are related field coil design and, in particular, to magnetic field coil design for power transfer and for communications.

DISCUSSION OF RELATED ART

Magnetic field coils are used throughout mobile devices. These uses include, for example, wireless power transfer and wireless communications such as, for example, magnetic secured transmission. In some applications, a single coil installation has multiple functionalities. In other applications, a single wireless device may include multiple coils, each performing different functionalities.

Wireless power transfer is becoming a ubiquitous aspect in mobile devices, with wireless power chargers being deployed throughout both public and private spaces. Mobile devices can be placed in the vicinity of a wireless power charger and batteries within the mobile devices charged. In a common wireless power system, a wireless power transmitter includes a transmitter coil that is driving to provide a time-varying magnetic field. A mobile device with a wireless power receive can be placed in the vicinity of the transmitter coil such that the time-varying magnetic field drives a current in a receiver coil of the mobile device. Power is thereby transferred between the wireless power transmitter and the mobile device. The mobile device may, itself, perform the role of a wireless power transmitter such that it can power or charge other devices placed in its vicinity.

In some applications, the coil functionality can be communications. For example, in some applications, the coil can be used for near-field communications (NFC). NFC coils are typically small and low-powered coils. In other applications, the coil can be used for magnetic secured transactions (MSTs). MST coils are driven to emulate data that a credit-card reader would normally receive from a credit card. This allows the mobile device to act as a credit card and to allow a user to make payments directly from the mobile device.

However, in many of these applications, operation of the coils can cause heating of the mobile device, can provide a large power drain on the battery, and may adversely affect operation of the battery. In particular, magnetic field lines that do not contribute to the functionality of the coil can cause heating of the mechanical device and may adversely affect the battery of the device itself. Further, these magnetic field lines that are not directly involved in the functionality of the coil represent inefficiencies in operation.

Therefore, there is a need for better coil designs.

SUMMARY

In accordance with aspects of the present invention, a coil arrangement is presented. A coil arrangement according to some embodiments includes at least one coil positioned to provide a magnetic field in a first area and configured to reduce the magnetic field in a second area outside of the first area. In some embodiments, at least one coil includes a bent solenoid oriented in the X-Y plane, the bent solenoid localizing magnetic field flux at ends of the bent solenoid. In some embodiments, the bent solenoid can include end caps to further direct the magnetic flux. In some embodiments, at least one coil includes a flattened solenoid with end caps to direct the magnetic flux. In some embodiments, the coil arrangement is a configuration of multiple coils.

In some embodiments, a method of providing an optimized multiple coil configuration includes defining an X-Y area about a multiple coil configuration; providing a multiple coil configuration; simulating field strengths for the multiple coil configuration; determining the effective field strength; determining whether multiple coil configuration is optimal based on the effective field strength in the X-Y area; and if the multiple coil configuration is not optimal, adjusting the multiple coil configuration.

These and other embodiments are further discussed below with respect to the following figures.

BRIEF DESCRIPTION OF THE DRAWINGS

FIGS. 8A, 8B, 8C, and 8D illustrate another embodiment of the present invention.

FIGS. 11A, 11B, and 11C illustrate a 3-D magnetic field strength plot for a circular coil, a graph of the field strengths at a height over the coil, and the effective field strength with respect to a particular receiver coil, respectively.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1A:
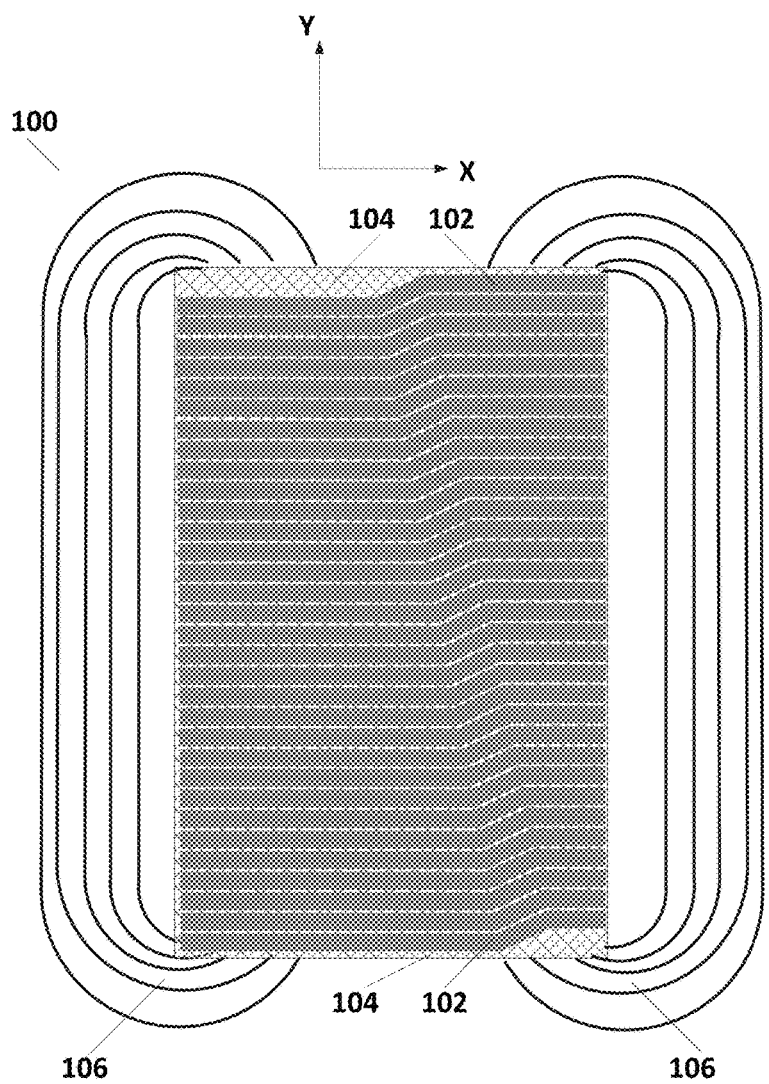
FIGS. 1A and 1B illustrate a conventional coil design.
Figure 1B:
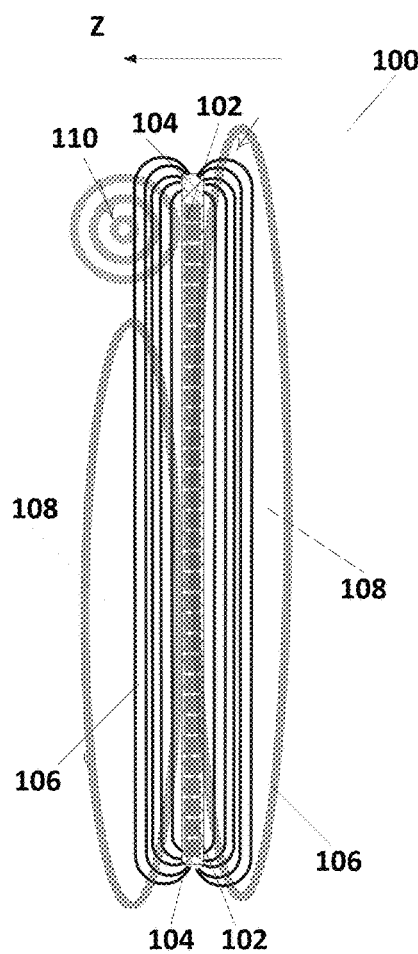

FIGS. 1A and 1B illustrate a conventional coil 100. Such a design can be used for wireless power transfer or may be a MST coil. Coil 100 as illustrated in FIGS. 1A and 1B is, typically, a flat coil design similar to a squashed solenoid with a ferrite core. FIG. 1A illustrates a flat side of coil 100 whereas FIG. 1B illustrates a side view of coil 100. As illustrated in FIG. 1A, coil 100 includes coils 102 wrapped around a flat "candy-bar" shaped ferrite core. When powered, magnetic field lines 106 are generated.

FIG. 1B illustrates a side view of coil 100. As illustrated in FIG. 1B, areas 108 represent a large amount of wasted magnetic field lines, representing a large amount of wasted energy storage volume. The magnetic field in areas 108 can interact with the mobile device and contribute to heating. Area 110 represents the area were a high flux density is desired, for example to result in MST data transfer.

As illustrated in FIGS. 1A and 1B, coil 100 lies flat in the X-Y plane of the mobile device with the +Z direction denoting a direction away from the mobile device in which coil 100 is mounted. Consequently, the −Z direction is towards the majority of components of the mobile device. This convention for the coordinates is carried throughout this disclosure, with the X-Y plane denoting a plane (a flat surface) of the mobile device and the Z direction being a direction away from most components of the mobile device.

As is illustrated, the field lines extend far beyond the extent of coil 100 and can coupled to the housing and other components of the device on which it is mounted. As a result, such coils have a lot of challenges, including causing device heating, having large flux areas, having a risk of ferrite saturation, and having large wasted magnetic energy storage volumes. Additionally, these coils may have a high cost for manufacture.

Figures 2A, 2B:
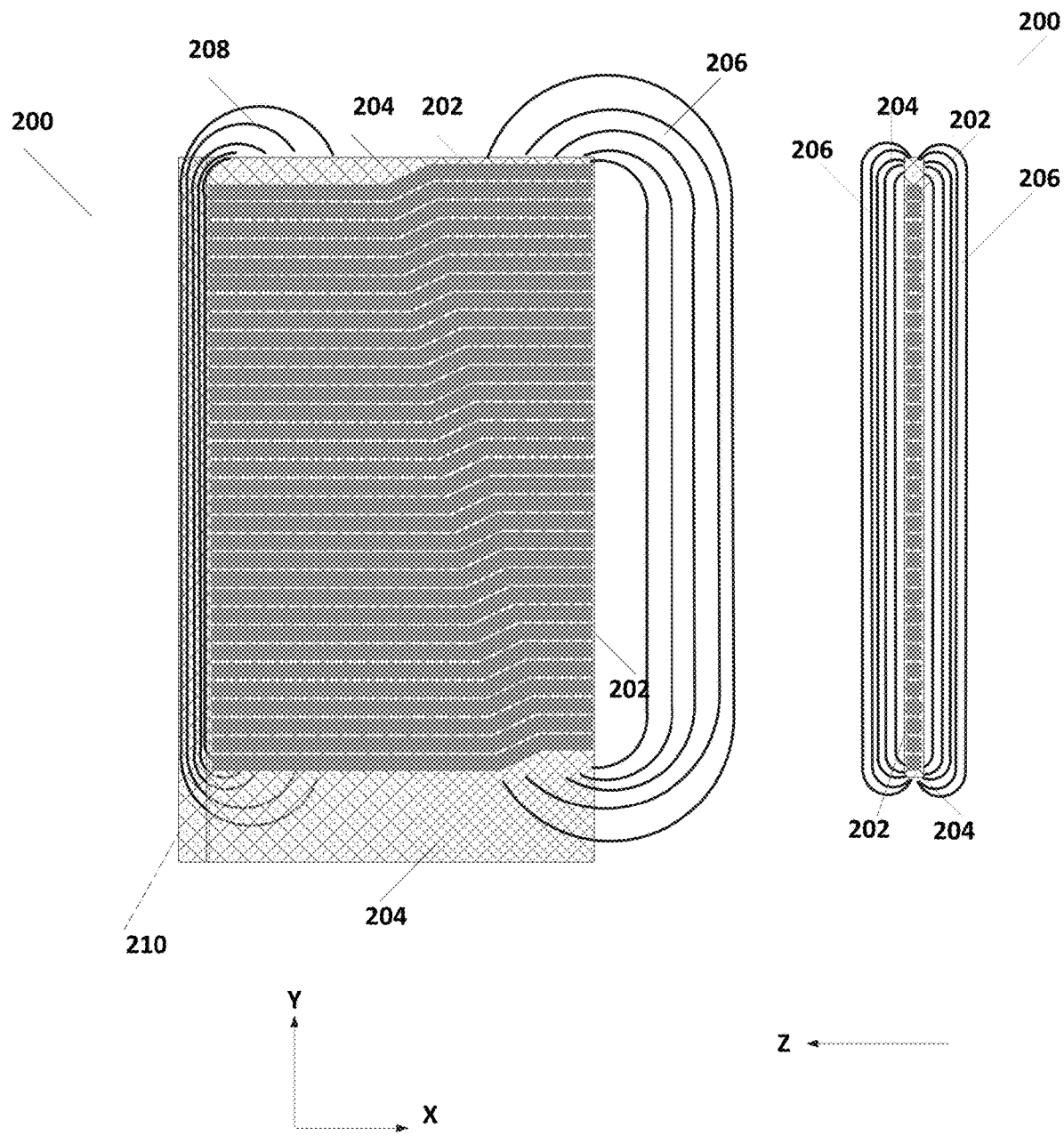
FIGS. 2A and 2B illustrate another conventional coil design.

FIGS. 2A and 2B illustrate another conventional coil 200. As illustrated, coils 202 are wrapped around a ferrite core 204. In addition, a side ferrite 210 can be placed on one side of coil 200. The resulting flux lines 206 and 208 are illustrated. As shown, flux lines 208 can be directed by side ferrite 210, and therefore can be better confined. Flux lines 206, however, still have a large extent and contributes to wasted energy and heating of the mobile device to which it is attached. Addition of more ferrite material can also hurt distance characteristics and complicates the coil design.

Consequently, conventional coils as illustrated in FIGS. 1A, 1B, 2A, and 2B have undesirable effects such as, for example, causing phone heating, having large flux areas, having risk of ferrite saturation, having large wasted magnetic energy storage volumes, and are high cost for manufacture.

According to some embodiments of the present invention, coils are designed to better confine the magnetic field flux to areas where it is desired to perform the particular functionality. Such embodiments direct the magnetic flux into desirable directions and away from directions where heating and interference with other components of a mobile device may be an issue.

Figure 3A:
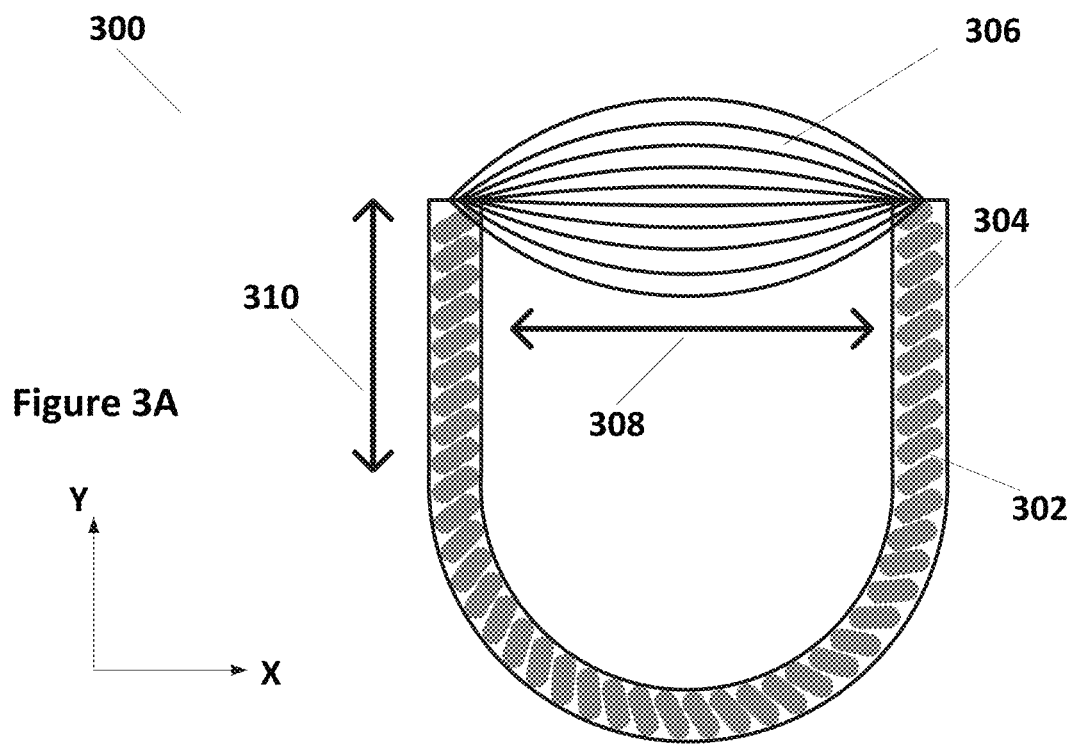
FIGS. 3A and 3B illustrate a coil design according to some embodiments.
Figure 3B:
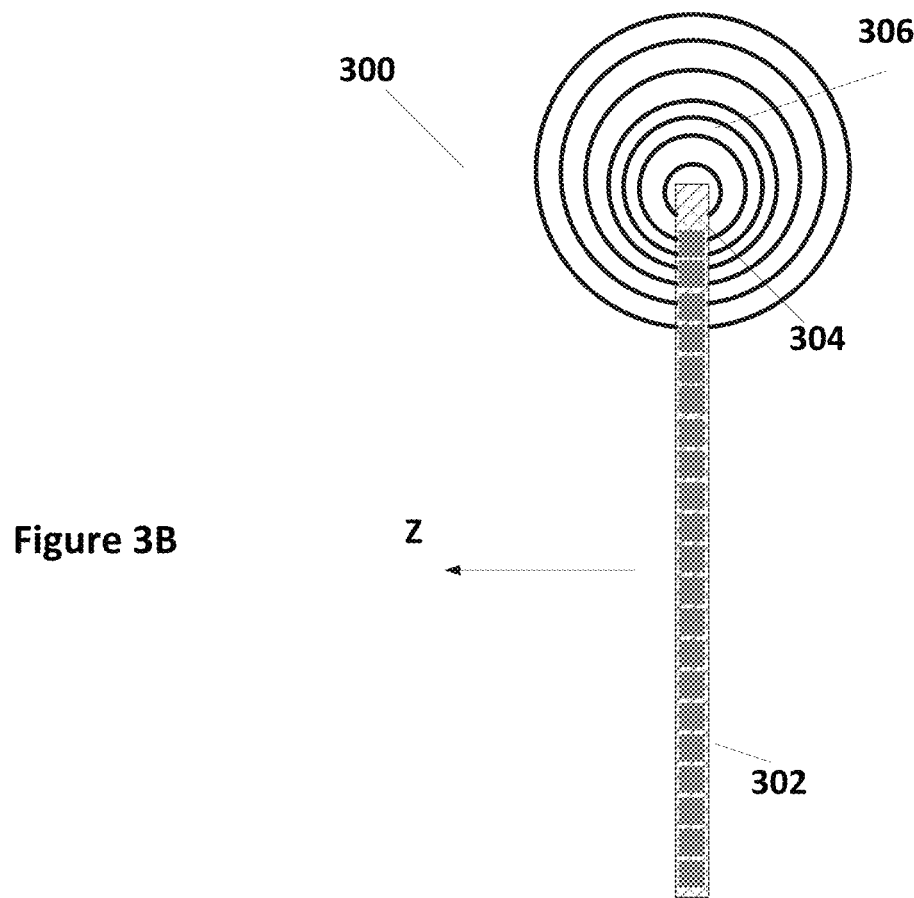

FIGS. 3A and 3B illustrate on embodiment of coil 300 according to some embodiments. Coil 300 is formed by coils 302 wrapped around a ferrite core 304 which is bent in a U-shape with a straight length 310 and a width between ends of 308. The length 310 can be determined by the number of turns of coil 302. The separation width 308 helps to improve the Z distance extent. The flux lines 306 are formed by the configuration illustrated in FIG. 3A. FIG. 3B illustrates a side view of the configuration illustrated in FIG. 3A.

FIGS. 3A and 3B illustrate the bent solenoid design. The length of the bent solenoid is set by the number of turns while the separation between the ends affects the Z distance reached by the produced magnetic flux. Although a ferrite 304 is shown in FIGS. 3A and 3B, in some embodiments, ferrite may not be needed. The configuration illustrated in FIGS. 3A and 3B limits the spatial extent of field lines 306 into a more useful area, which results in less heating and more efficient application of the magnetic field into the desired area. As is illustrated, however, in flux lines may still extend beyond the region where it would be most useful. However, in some embodiments the flux 306 can be further confined, for example by providing a cap that couples to the coil turns and directs current.

Figures 4A, 4B, 4C:
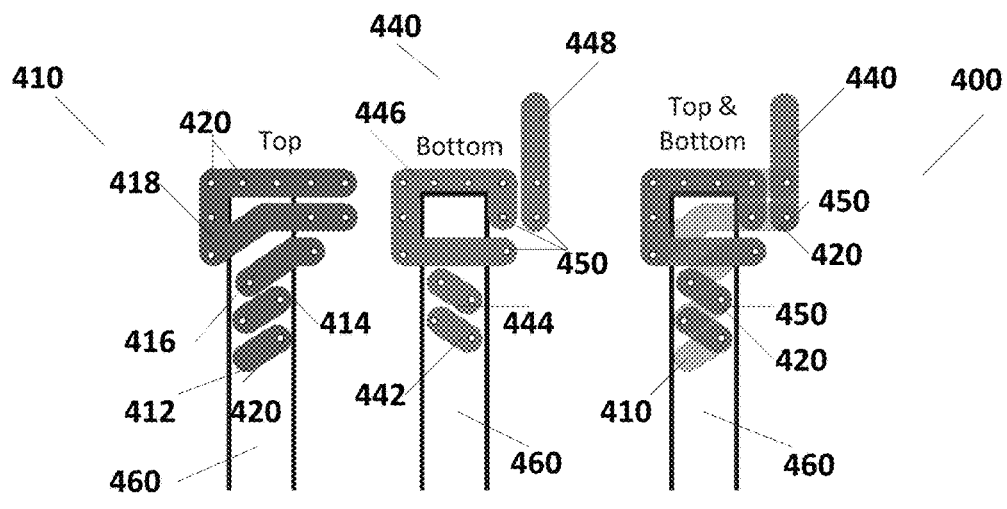
FIGS. 4A, 4B, and 4C illustrate a coil cap design that can be used with some embodiments of the present invention.

FIGS. 4A, 4B, and 4C illustrate an example of a cap 400. Cap 400 is further illustrated in FIG. 4C and includes a top portion 410 and a bottom portion 440. Top portion 410 is illustrated in FIG. 4A as positioned on a ferrite core 460. In this description, reference to "top" and "bottom" refers to the position in the Z direction, with the top portion being positioned over the bottom portion in the +Z direction. As illustrated in FIG. 4A, top portion 410 includes sections 412, 414, 416, and 418. Sections 412 and 416 can align with coil turns of the coil. As illustrated in FIG. 4B, bottom portion 440 includes sections 442, 444, 446, and 448. As illustrated in FIG. 4C, top portion 410 is positioned over bottom portion 440 such that vias 420 of top portion 410 alight with vias 450 of bottom portion. Consequently, section 442 of bottom portion 440 is coupled between sections 412 and 414 of top portion 410, section 444 of bottom portion 440 is coupled between sections 414 and 416 of top portion 410, bottom portion 446 is coupled with top portions 416 and 418 of top portion, and bottom portion 448 is coupled to provide current to section 418 of top portion. Consequently, current input to bottom portion 448 is distributed through the sections of top portion 410 and bottom portion 446 before entering the coil turns of the coil wound around ferrite 460 to affect the magnetic field flux at the end of ferrite 460.

Figures 5A, 5B, 5C:
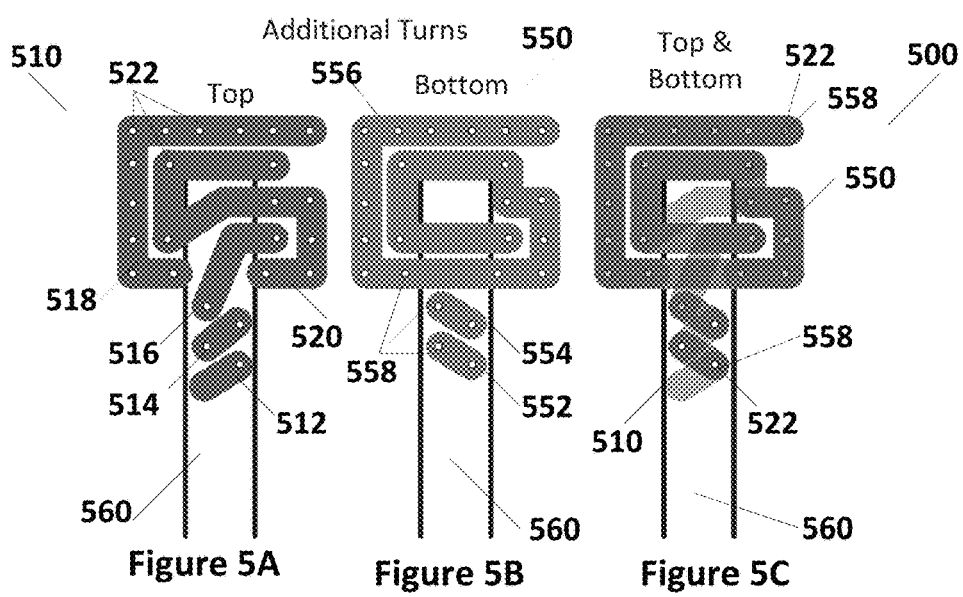
FIGS. 5A, 5B, and 5C illustrate another coil cap design according to some embodiments of the present invention.

FIGS. 5A, 5B, and 5C illustrate another example of a cap 500. Cap 500 is illustrated in FIG. 5C includes a top portion 510 coupled over a bottom portion 550. As illustrated in FIG. 5A, top portion 510 includes sections 512, 514, 516, 518, and 520 arranged on ferrite 560. Bottom portion 550 includes sections 552, 554, and 556 arranged on ferrite 560. As illustrated in FIG. 5C, top portion 510 is positioned over bottom portion 550 on ferrite 560. Top portion 510 is electrically coupled to bottom portion 550 through vias 522 in top portion and corresponding vias 558 in bottom portion 550. As illustrated in FIG. 5C, section 552 of bottom portion 550 couples between portions 512 and 514 of top portion 510; section 554 of bottom portion 550 couples between sections 514 and 516 of top portion; and section 556 of bottom portion 550 couples sections 516, 518, and 520 of top portion 510. Consequently, current input to section 556 of bottom portion 550 is distributed between sections of top portion 510 and bottom portion 550 to affect the flux.

Figure 6:
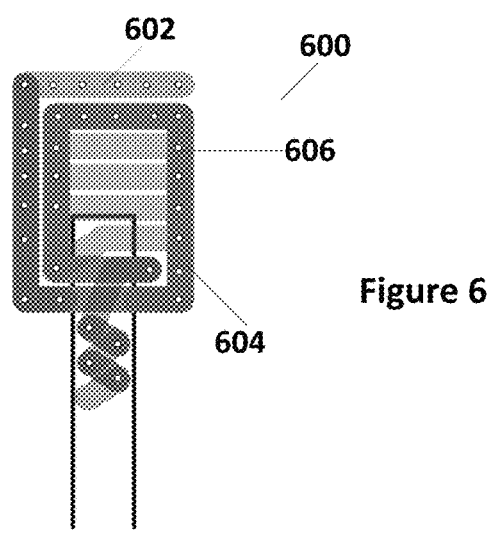
FIG. 6 illustrates an extended cap that can be used in some embodiments of the present invention.

FIG. 6 illustrates a stretched example of a cap 600, which is similar to cap 500 illustrated in FIGS. 5A, 5B, and 5C. As is illustrated, cap 600 includes a bottom portion 604 and a top portion 602, which are arranged relative to one another. To portion 602 and bottom portion 604 are electrically coupled through vias 606.

Figure 7A:
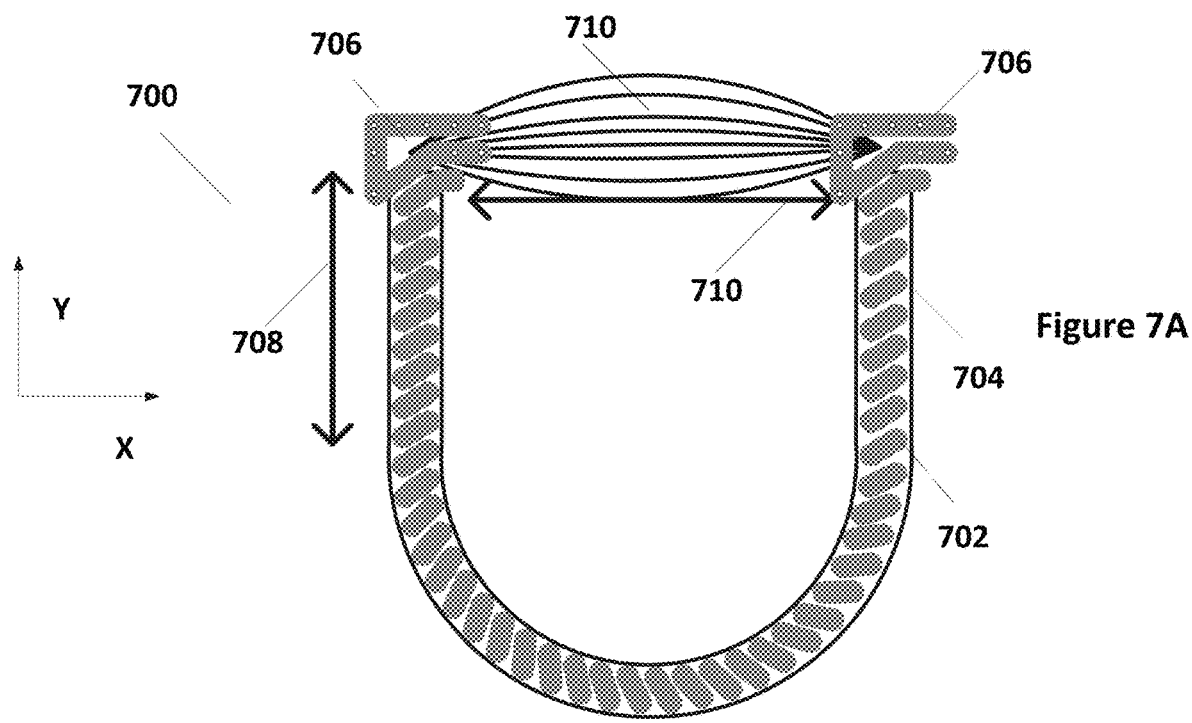
FIGS. 7A and 7B illustrate an embodiment of the present invention using caps.
Figure 7B:
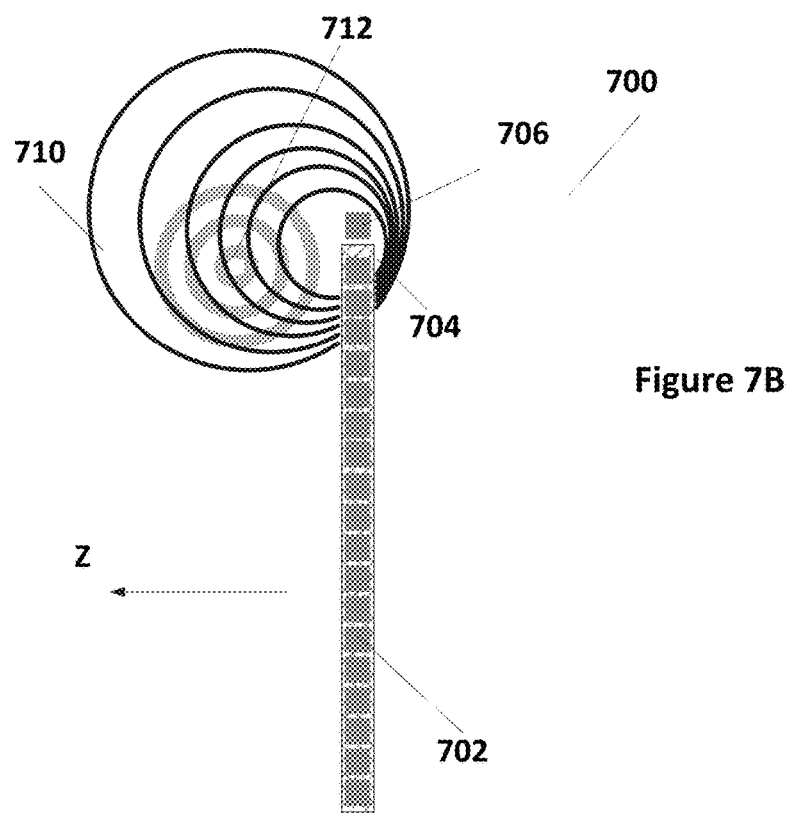

FIGS. 7A and 7B illustrate an embodiment of a bent solenoid coil 700 with end caps 706 to help confine and direct the magnetic field lines 710. As shown in FIG. 7A, coil 700 includes coils 702 wrapped around a bent ferrite core 704. In some embodiments, coil 700 may be an air-solenoid, with ferrite core 704 being absent. As discussed in FIG. 3A, a length 708 can be determined by the number of turns in coil 702. The width 710 between ends of coil 700 can affect the extent of the flux 710 produced between the ends of coil 700. As is further shown in FIG. 7A, end caps 706 placed on the ends of core 704 can help to direct and confine flux 710 further into an area where it is more useful. Cap 706 can be, for example, cap 400, 500, or 600 as described above or may be a separate similar design. In any event, caps 706 provides further current turns onto coil 702 that help direct magnetic field lines between the ends of core 704.

FIG. 7B illustrates a side view of coil 700. As illustrated, the flux 710 can be directed in the +Z direction. Consequently, there the flux in the X-Y direction is reduced, especially in the −Z direction where other components of a mobile device may lie. Consequently, the flux 710 has a concentration in the working area 712 where it is most useful, either for MST or for wireless charging.

Confining flux 710 can also result in less wasted energy storage, resulting in a more efficient coil and less current drawn from a battery of the mobile device. Further, confining flux 710 can also result in less heating of lossy components in the vicinity of coil 700, including further heating of the battery as a result of being exposed to magnetic flux 710.

Figure 8A:
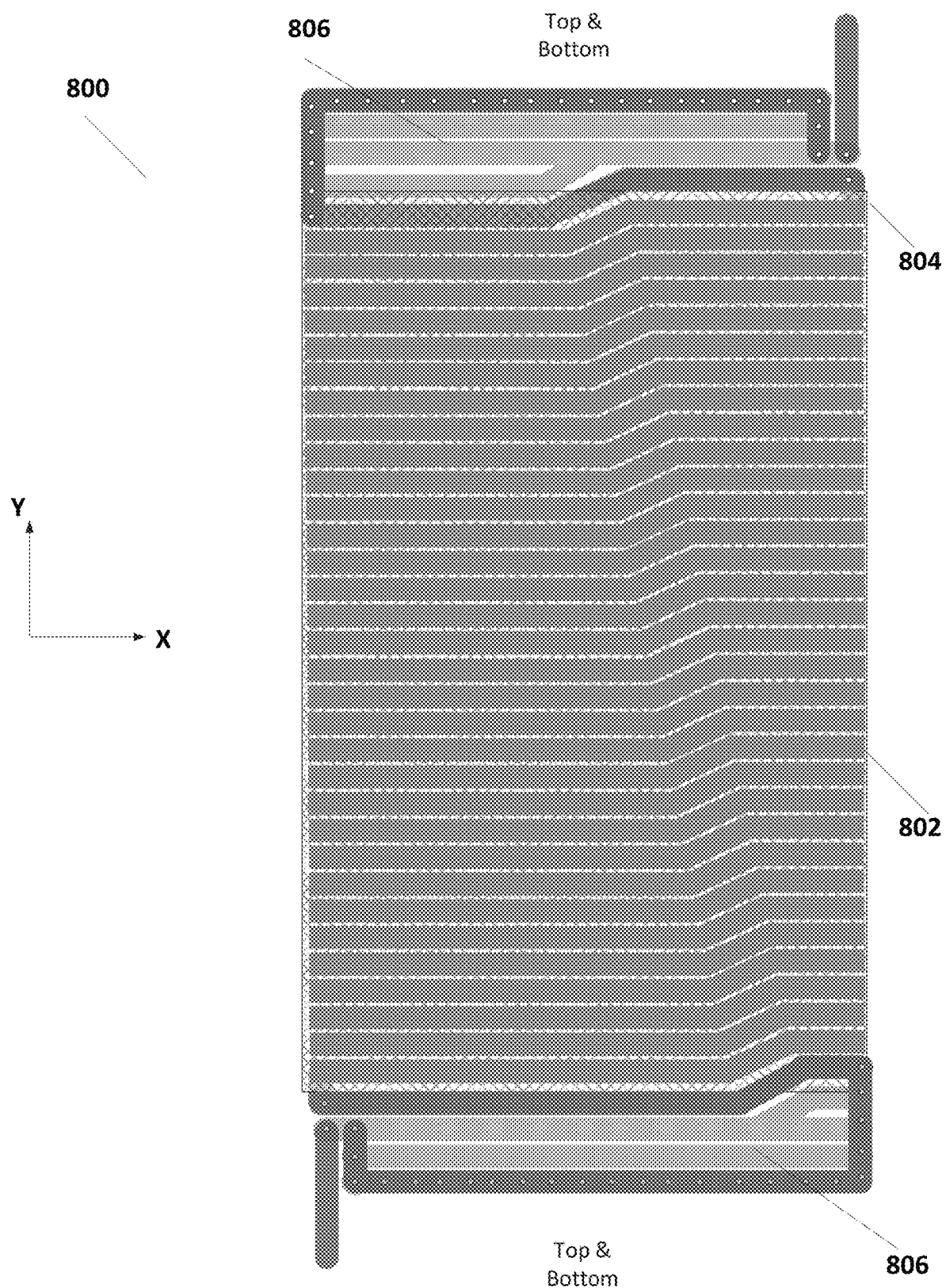

FIG. 8A illustrates another coil 800 according to some embodiments. Coil 800 is similar to coil 100, which as described above is more conventionally used. As illustrated in FIG. 8A, coil 800 includes coils 802 wrapped around a flat ferrite core 804 in a "candy-bar" configuration. As is further illustrated in FIG. 8A, caps 806 are placed on the ends of ferrite 804 and coupled to the turns of coil 802 in order to provide currents that effect the generated flux of coil 800.

FIGS. 8B and 8C illustrate an example of a cap 806. Cap 806 includes top portion 810 and bottom portion 812. As shown in FIG. 8B, top portion 810 includes an array of coupled current carrying paths. As shown in FIG. 8C, bottom portion includes a section 814 and section 816. Top portion 810 and bottom portion 812 are coupled through vias 818 in the top portion and corresponding vias 820 in the bottom portion. Consequently, current input to section 814 of bottom section 812 is distributed through the various current paths of section 810 of top portion. This current distribution can help flux to be drawn to the opt portion 810 in operation.

FIG. 8D illustrates a side view of coil 800 with end caps 806 formed with top portion 810 and bottom portion 812. As illustrated in FIG. 8D, the magnetic flux 822 is drawn in the +Z direction to create an area 824 with useful magnetic flux 822. Additionally, flux is drawn from the −Z direction, leaving a residual flux 826, so that the amount of energy wasted is lowered, along with heating and other negative effects.

Consequently, caps 806 create a target Z-X-Y coverage area 824 for end application. The example is compatible with customer applications and targets the center of the phone and does not use the concept of bent solenoids as illustrated in FIGS. 3A and 7A. Multiple coils can be used simultaneously in some embodiments.

Figure 9A:
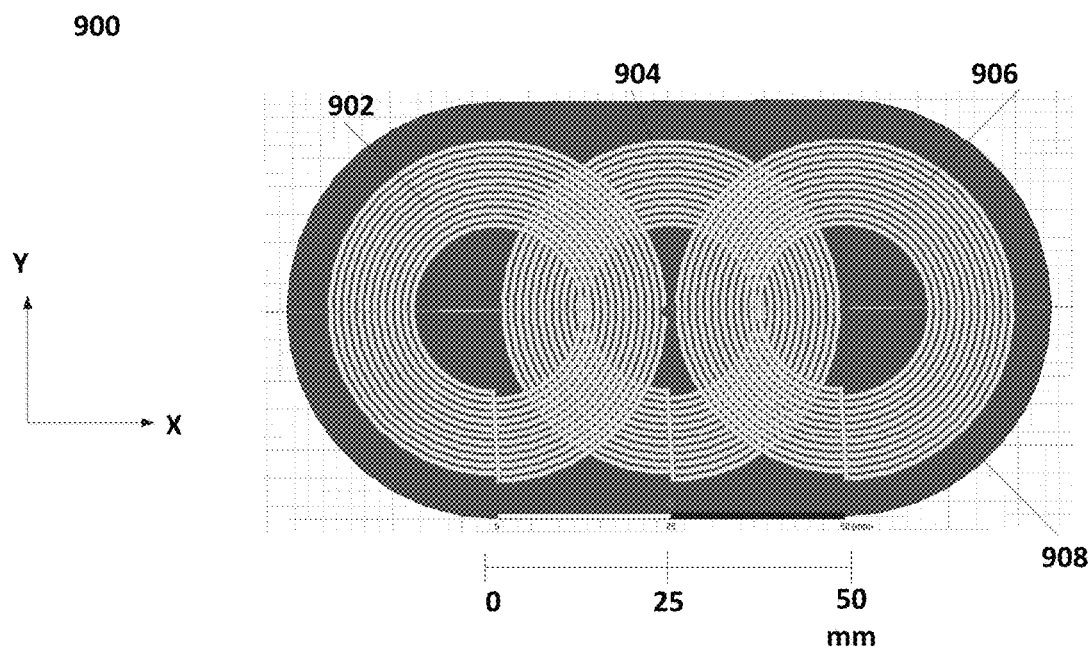
FIG. 9A illustrates a multi-coil configuration.

In addition to coils such as those illustrated above, wireless power transmission coils include flat coil spiral coils, which may be oval shaped or circular shaped. For example, in the Qi standard or A4WP standard, an A11 coil is a flat circular spiral coil with diameter of about 40-50 mm and height of 3.8 mm. An A6 coil is an oval coil with length about 50 mm, width about 45 mm, and height of about 1.2 mm. These coils may be used individually or may be multiple configured to provide a magnetic field over a particular area. FIG. 9A, for example, illustrates a grouping 900 of three circular coils 902, 904, and 906, arranged on a substrate 908. In some embodiments, substrate 908 may be a ferrite plate that serves to direct the field lines generated by coils 902, 904, and 906 and to protect components of a device (mobile or otherwise) that may be beneath coils 902, 904, and 906. Circular coils 902, 904, and 906 may, for example, be the A11 standard coil as described above. As is illustrated in FIG. 9A, the coils may be separated, for example, by center distances of about 25 mm.

In accordance with some embodiments of the present invention, placement and shapes of coils in a multi-coil system can be determined in order to provide efficient transfer of energy. In particular, Maxwell simulation results are correlated with bench data to provide efficiency predictions for a given multi-coil transmission structure with a single coil receiver structures as a function of X-Y placement of the receiver over the transmit coils.

Figure 9B:
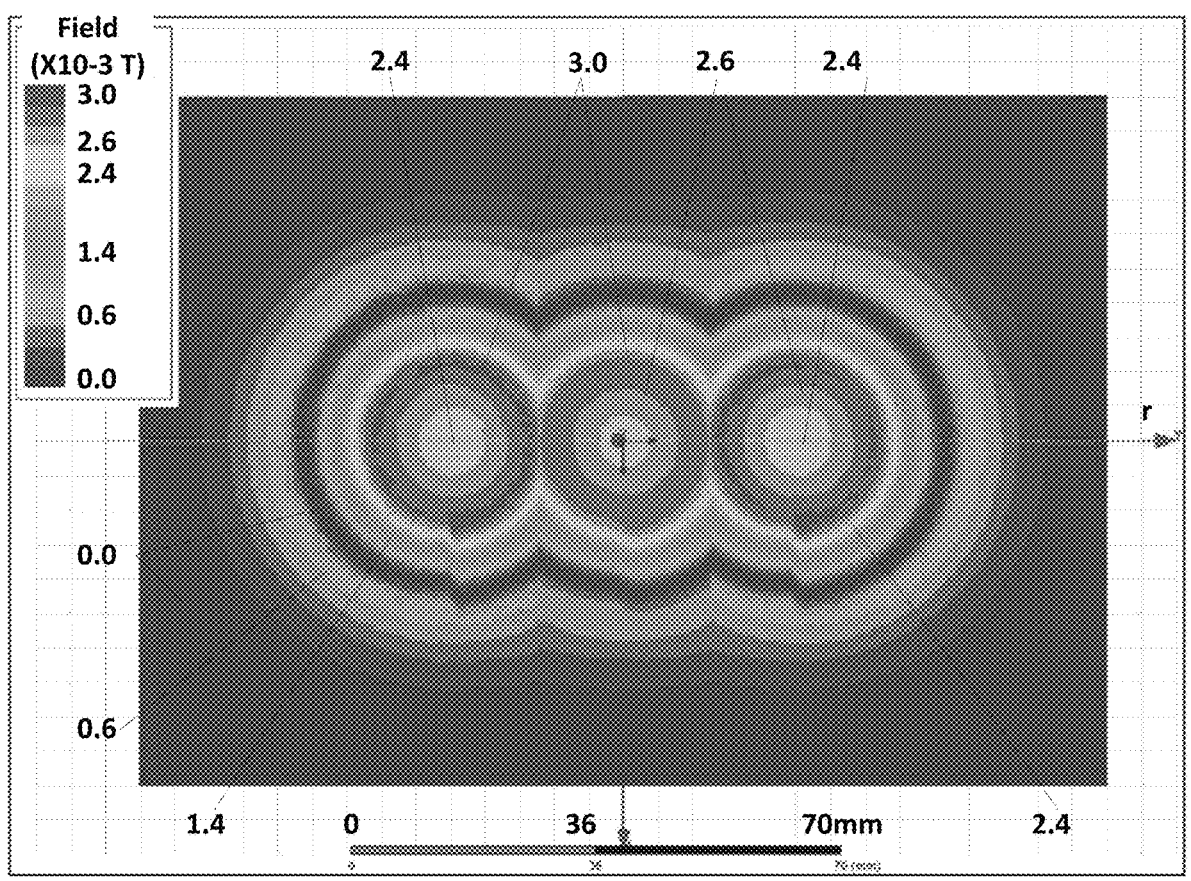
FIG. 9B illustrates a simulation of magnetic field strengths over the multi-coil configuration of FIG. 9A.

FIG. 9B illustrates a field plot in the X-Y plane of magnetic field strength at a height Z of about 3 mm above the coil structure as illustrated in FIG. 9A. In particular, in the simulation illustrated in FIG. 9B, three coils that are a hybrid between an A11 and A13 coil, are arranged as illustrated in FIG. 9A. Current is run through each of coils 902, 904, and 906 separately and the resulting mapping of the magnetic flux is combined to create the mapping illustrated in FIG. 9B. In this particular testing, a current of about 3 A through each of the coils is used. As is illustrated in FIG. 9B, field strengths range from 0.0 T (Tesla) to $3.0 \times 10^{-3}$ T. As is illustrated, the field at the center of each coil is about $2.4 \times 10^{-3}$ T while the peak field is about $3.0 \times 10^{-3}$ T. As is illustrated in FIG. 9B, multi-coil systems that are un-optimized have low performance at edge boundaries between the fields generated by each of the coils. This poor performance includes the effects of heating of the mobile device to which the coil arrangement is mounted. Additionally, potential X-Y area over the coil arrangement has reduced efficiency due to overlap of high efficiency regions between the coils.

Further, friendly heating can occur by induced currents in un-used coils in the coil arrangement as well as heating of other components of the device with which the coil arrangement is utilized. In some cases, circulating currents in un-used coils can be managed with blocking MOSFETS. Further, ferrite base plates as illustrated in FIG. 9A as substrate 908 can be used to redistribute the flux characteristics in the −Z direction. In some embodiments, the coils can be arranged with the ferrite base plate to arrive at an ideal solution.

In accordance with embodiments of the present invention, the coils in a multi-coil arrangement can be modified such that, at each X-Y position, the simulated field strength can be arranged to maximize the efficient transfer of wireless power between the multi-coil arrangement and a receiver at a height Z about the arrangement. As is further detailed below, there is a correlation between the simulated coil field strength with the Tx-Rx efficiency. As a result, the shape of the multiple coils can be arranged such that a simulation of field strengths across a particular area can result in a desired efficiency. In particular, the estimated field strengths can be used to optimize efficiencies at coil transition boundaries.

Figure 10A:
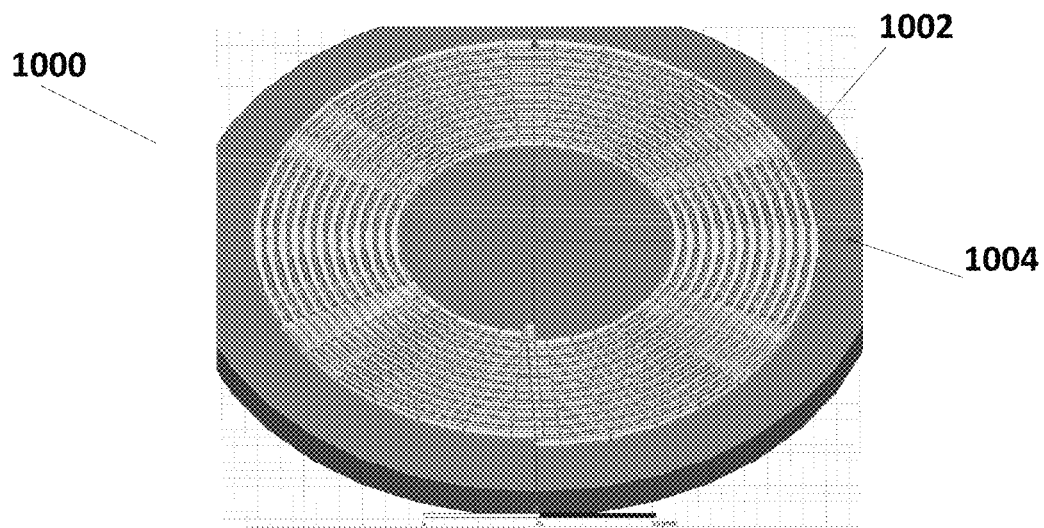
FIGS. 10A and 10B illustrates a typical coil and a magnetic field strength plot of the typical coil, respectively.

FIG. 10A illustrates an example of coil 1000, which is similar to an A11 coil. As illustrated, coil 1000 includes a spiral set of conductive turns to form coil 1002. The coil 1000 is formed on a substrate 1004, which in some cases may be a ferrite plate.

Figure 10B:
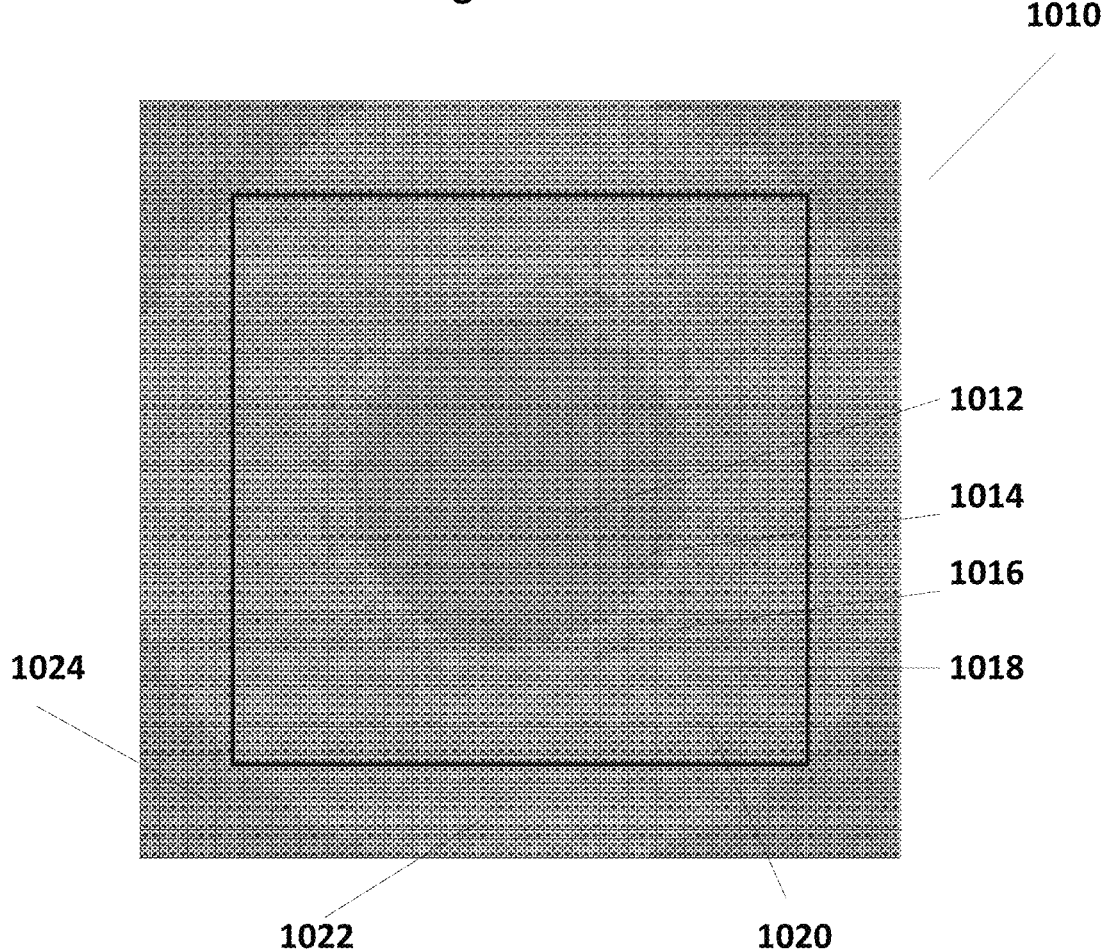

FIG. 10B illustrates an example 1010 of field plots from the A11 coil 1000 illustrated in FIG. 10A. These field plots are formed in Excel using calculations of the magnetic field strengths, which for example are imported to Excel for further processing from Maxwell or other simulation program. As is illustrated in FIG. 10B, field strengths are divided into various roughly circular areas, including the central portion 1012, portions 1014 and 1016 over coil 1000, and outside regions 1018 and 1020. Far outside regions where the field strength will fall off rapidly are illustrated as regions 1022 and 1024.

Such plots as illustrated in FIG. 10A can be quickly formed for various TX coil shapes and particular shapes and placements can be derived based on a specified X-Y area where efficient charging is desired. Such an optimization in coil shape and placement improves performance of charging a receiver system, especially at coil transition boundaries. Further, friendly metal heating can be managed by limiting the TX coil active area, for example to the active area of, for example, an A11 area, and by using transmit driver topologies to isolate unused coils.

FIG. 11A illustrates a three-dimensional plot 1100 of magnetic field strengths around a representative A11 coil that is produced by the program Maxwell from Ansys, Inc. Maxwell uses a finite elements program to calculate the magnetic field flux around a particular coil configuration, which can be input to Maxwell based on a Cadence Allegro drawing tool. As illustrated in FIG. 11A, plot 1100 includes a large peak field strength in the center region 1102, surrounded by a secondary peak 1104 surrounding the center region 1102, with a tail-off region 1106 around the secondary peak 1104, and finally a zero region 1108 where little field strength is predicted in the simulation.

The magnetic field strength data, for example that shown in FIG. 11A, can be extracted into, for example, an Excel calculation. The extracted data 1110 can be illustrated, for example as shown in FIG. 11B. FIG. 11B illustrates the magnetic field strength at a given height about the simulated coil. As illustrated in FIG. 11B, a large field strength in center region 1102 is provided in the center with a smaller field strength from secondary peak 1104 surrounding it, and reducing through tail-off region 1106 and zero region 1108 as the radial distance from the center is increased. The effective field strength (EFS) data 1112 for a given receiver coil configuration is illustrated in FIG. 11C. Consequently, using the extracted data and the conversion to EFS for a particular receiver coil configuration, the transmit coil configuration can be optimized to provide effective EFS over the desired area over the transmit coil configuration.

As discussed above, Maxwell includes an export feature that allows creation of a x-y grid of field strengths over a given area or volume. In the example of FIG. 11B, a 1 mm stepping at a 3 mm Z distance can be obtained to obtain the peak value. The effective field strength data illustrated in FIG. 11C can then be obtained by running an window average based on the inner aperture of the Rx coil's geometry. X and Y adjustments to the Rx coils geometry can then be added to increase or decrease the Rx area to adjust output of the window average so that the output of the window average creates an effective field strength (EFS) value. Each point on the plot as illustrated in FIG. 11 includes two values derived from a given geometric X-Y position at a given Z. For example the center of the coil will be (0,0,3).

Figure 12A:
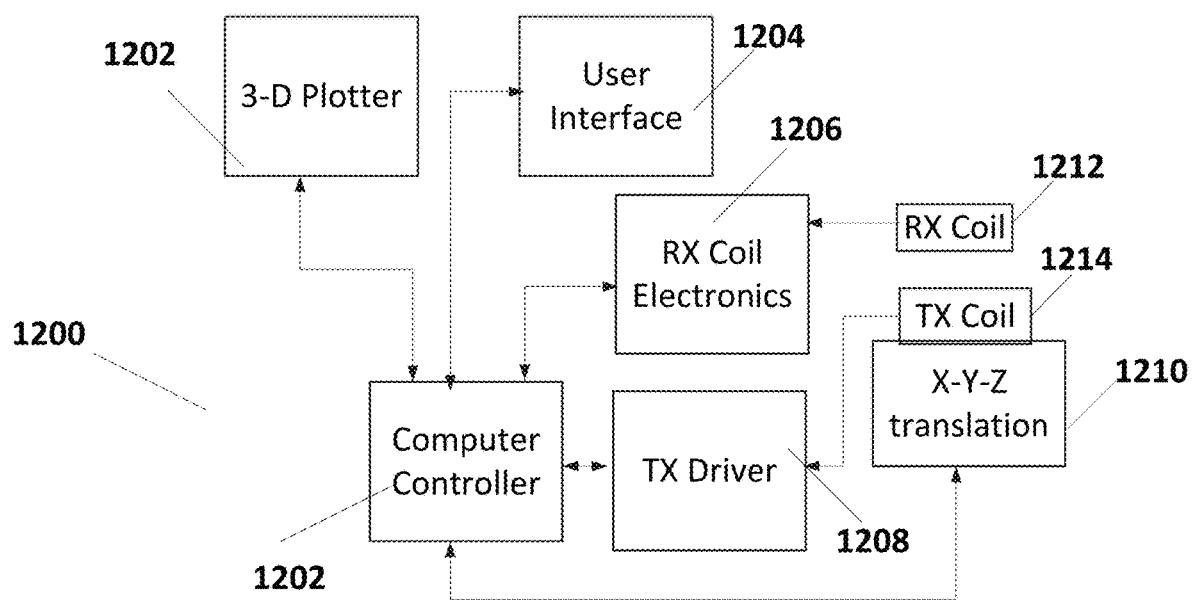
FIGS. 12A, 12B, and 12C illustrate a coil efficiency apparatus, a simulation of coil field strengths, and a correlation between the coil efficiency and the simulated coil field strengths, respectively.

As was discussed above, the efficiency of wireless power transfer between a transmit coil configuration and a particular receive coil can be correlated with the simulated magnetic field strength that is predicted by either the Maxwell program or by an Excel program that is used to calculate those field strengths based on the TX coil configuration. FIG. 12A is a block diagram of an automated system 1200 for mapping efficiency of wireless power transfer over transmit coils. As is illustrated in FIG. 12A, a controller 1202 is coupled to a transmit coil driver 1208. Transmit coil driver 1208 is coupled to a TX coil configuration 1214. Controller 1202 is also coupled to an X-Y-Z translation stage 1210 on which TX coil configuration 1214 is mounted. Controller 1202 can also receive data from RX coil electronics 1206, which is coupled to a RX coil 1212 that is positioned over TX coil 1214. Controller 1202 can move TX coil 1214 with respect to RX coil 1212 and measure the efficiency of power transfer at particular relative locations of TX coil 1214 and RX coil 1212. Controller 1202 can be any computing system capable of being programmed to take and store the data resulting in a mapping of efficiency of wireless power transfer between TX coil 1214 and RX coil 1212 as a function of relative position. For example, controller 1202 may include a data logger system. Controller 1202 is also coupled to a 3D-plotter 1202 for plotting the resulting data. A user interface 1204, which may include user input devices as well as video monitors, can be used to control the automation.

Figure 12B:
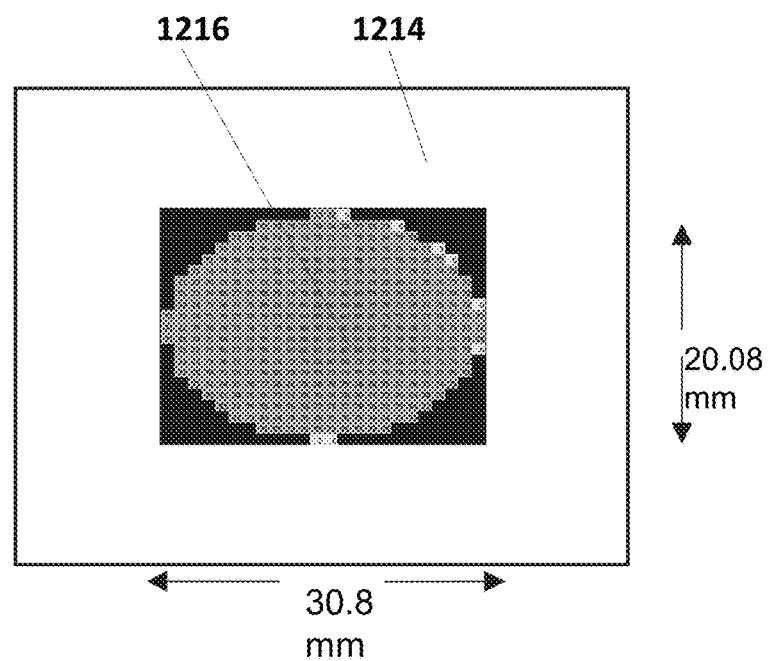

A simulated field strength plot 1216 can separately be computed from the structure of TX coil 1214 as discussed above. Such a plot is illustrated in FIG. 12B. Plot 1216 can be formed at any height in the area above TX coil 1214, taking into consideration the structure of RX coil 1212. Plot 1216 is formed by simulating the performance of TX coil 1214 under the conditions in which it is operated by automated data acquisition system 1200.

Figure 12C:
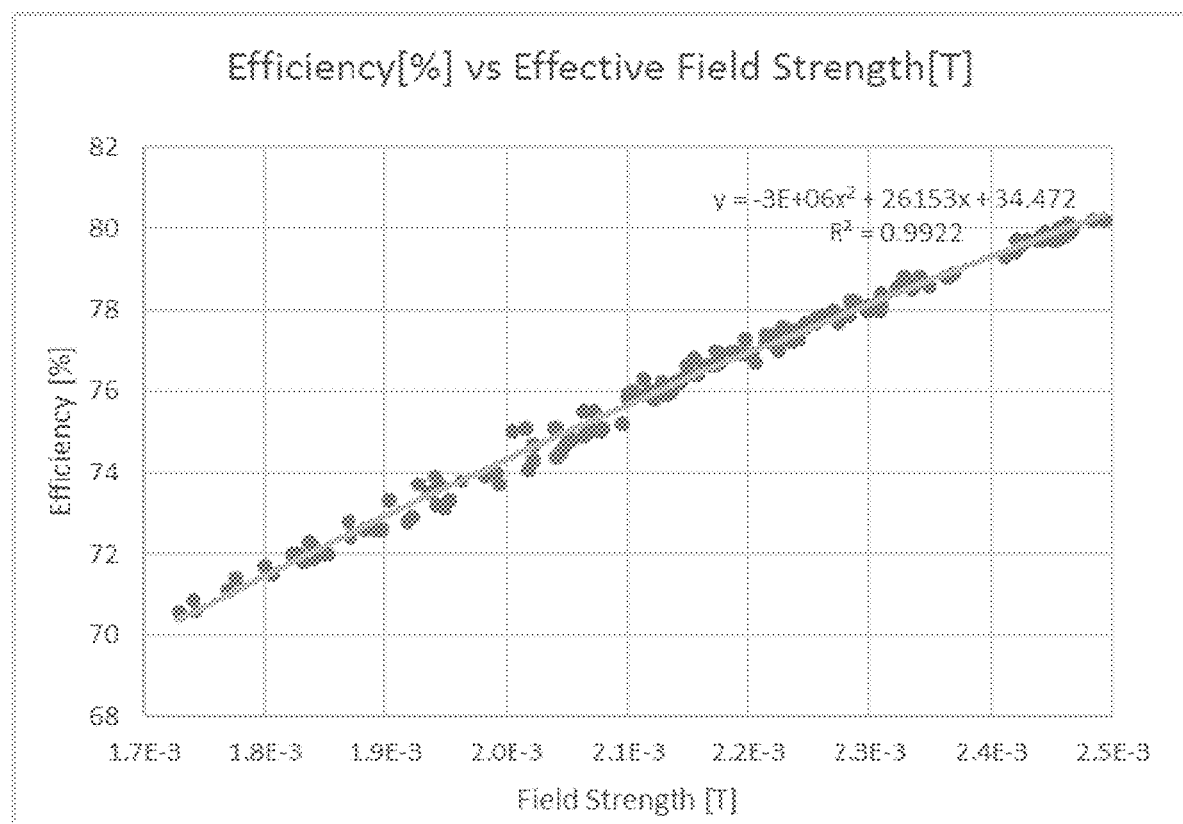

The data obtained by the automated data acquisition system 1200 for a particular height above transmission coil 1214 is illustrated in FIG. 12C. FIG. 12C illustrates a plot of the efficiency derived from the automated data acquisition system 1200 as a function of the field strength simulated for the coil configuration 1214. The efficiency data is taken at a given height over the X-Y oriented TX coil 1214 with simulated field strength data at the same height and position. The graph illustrated in FIG. 12C illustrates the compiled data based on these data sets. As is illustrated, the data falls with very high correlation (about 99%) on a particular linear graph. Using this data, the Tx-RX efficiency for a given effective field strength can be calculated.

As is illustrated in FIG. 12C, using simulated field strength data a TX coil shape can be determined from the X-Y specification desired. Specifically, a desired X-Y area and performance can result in the output TX coil shape. The end results are an optimized TX multi-coil structure for a given X-Y area requirement.

The results illustrated in FIG. 12C illustrates a linear characteristic. At each grid point the EFS vs the Bench Measured efficiency at a particular X-Y position and Z height is plotted. Normally, this plot has no obvious correlation—it looks like a random scatter plot. But as the EFS calculation is adjusted by window size (and also increasing or decreasing the "corner shape" of the rx coil), it is found that a pretty good figure of merit plot can be created, as is illustrated in FIG. 12C, which we can then create a trend line. In some cases, some data at the edges are removed (established data collection principles are used here) to establish the linear relationship. This trend line and EFS geometry calculation methodology becomes the basis of the algorithm that allows determination of what the efficiency will be for a new arbitrary coil design.

Consequently the procedure for optimizing a new coil design uses simulation to find the field strength at a given heights over the X-Y area of interest, then use the trend line as illustrated in FIG. 12C to find what the efficiency of that coil design will be. Thresholds can be set based upon actual bench data which determines the maximum X-Y position at which a target Rx can function. Past this threshold, the Rx coil will "drop" its connection due to excess power loss or lost packets in a communications channel. Any threshold can be set for the target application.

The limit of the geometric average (center of RX Coil) is within a box where the edge of the Rx coil will go "off the edge" of the simulation data and the EFS window average will fail. Such a box is illustrated in FIG. 10B. Of course boundary conditions/rules can be set to "assume" some field characteristic once you run out of simulation data (linear approximation for example). However, the EFS can be limited to the box.

Figure 13A:
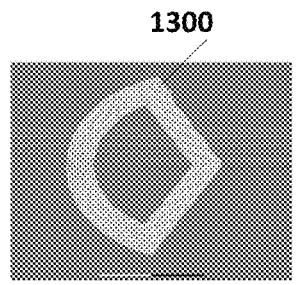
FIGS. 13A and 13B illustrate an example of a wedge shaped coil and wedge assembly.
Figure 13B:
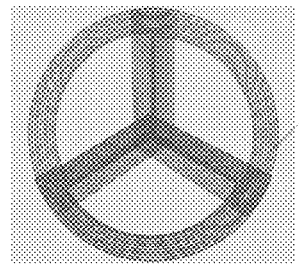

Methods according to some embodiments can be used with any coil configuration, for example circular coils such as A11 coils, oval coils such as A6 coils, wedge-shaped coils, and wedge-shaped configurations. As discussed above, FIG. 10A illustrates an A11 type coil 1000, which typically has a diameter around 40-50 mm. FIGS. 13A and 13B illustrates a wedge-shaped coil 1300 and a wedge-shaped coil assembly 1302, which involves three wedge-shaped coils 1300. Wedge-shaped coil assemblies provide for about 62% more X-Y area vs. typical A11 coils. A wedge-shaped coil assembly 130$s$ can have a diameter of about 56 mm, whereas the A11 type coil typically has about a 46 mm diameter.

Figure 14:
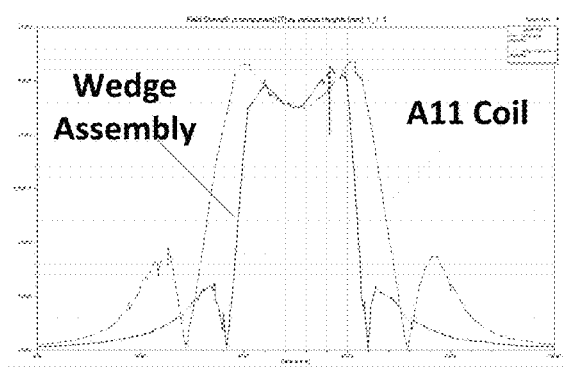
FIG. 14 illustrates simulated field strengths of a circular coil in comparison with a wedge assembly.

FIG. 14 illustrates simulated field strengths in a coil 1000 as opposed to simulated field strengths around a wedge coil assembly 1302. The data represents both coils being driven at about a 3 A current and data at about a 3 mm height above the coil.

Figure 15A:
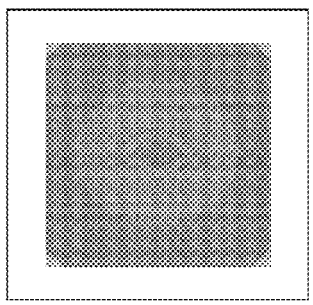
FIGS. 15A, 15B, and 15C illustrate raw field strength data from a wedge shaped coil, effective field strength for a wedge shaped coil with a horizontal receive coil, and effective field strength for a wedge shaped coil with a vertical receive coil, respectively.
Figure 15B:
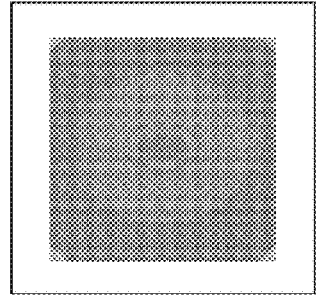
Figure 15C:
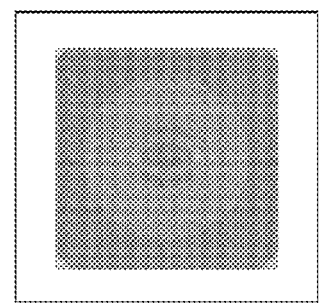

FIG. 15A illustrates the raw field strength for a wedge such as that shown in FIG. 13A. FIG. 15B illustrates the effective field strength for a wedge coil with a horizontally oriented receive coil positioned over the coil. FIG. 15C illustrates the effective field strengths for a wedge coil with a vertically oriented receive coil positioned over the coil.

Consequently, transmit coil design can be optimized for horizontal and vertically oriented receive coil. The excess field in EFS plot at vertex and shared edges can be used for optimization. The coils can be arranged such that areas of overlap can be removed during the optimization process.

Figure 16:
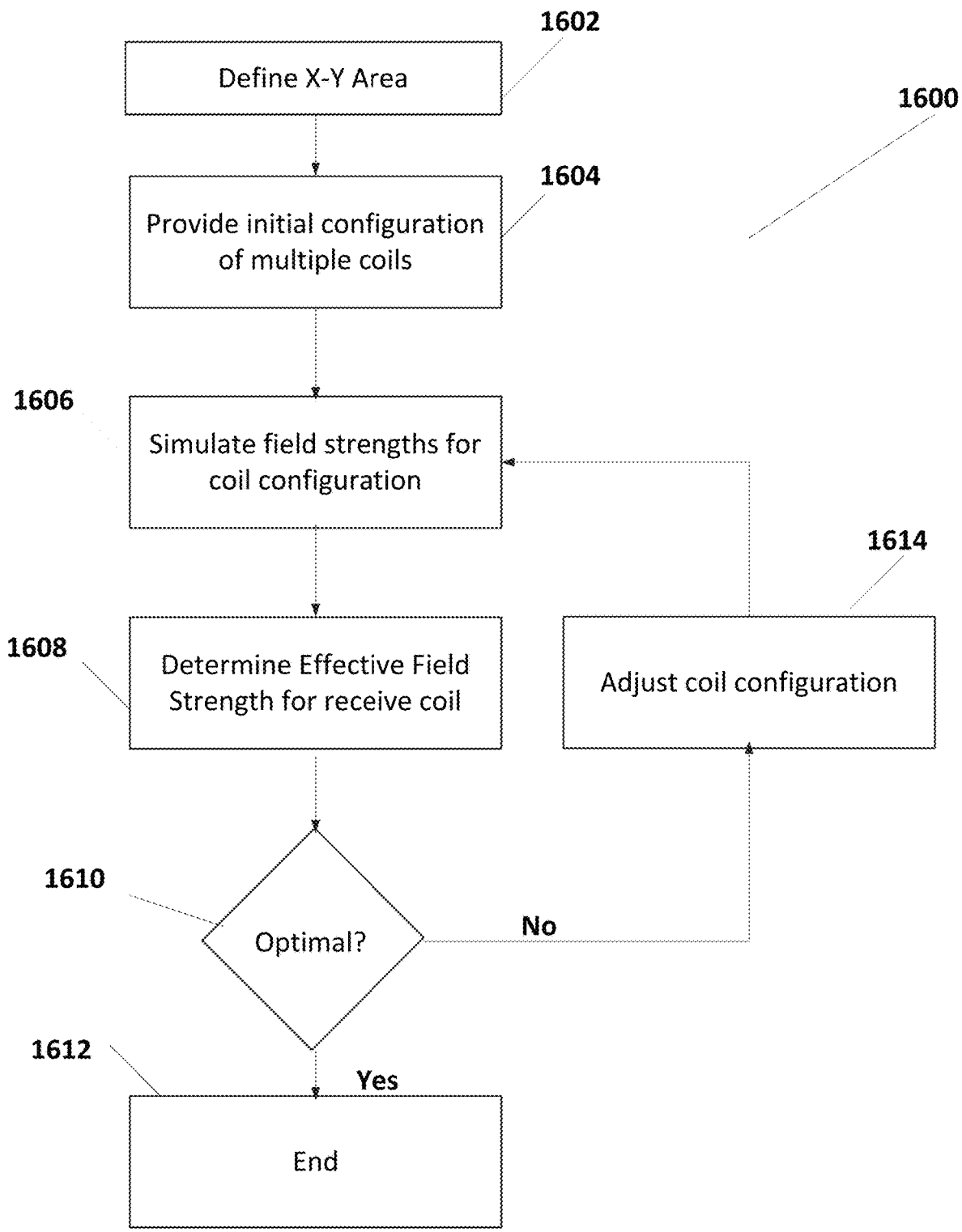
FIG. 16 illustrates a method of optimizing coil placement for a multi-coil transmit system.

An algorithm 1600 of optimally arranging multiple coils to provide efficient wireless power transmission over a particular defined area is shown in FIG. 16. As shown in FIG. 16, in step 1602 the area of coverage over the multiple coil arrangement is provided. In step 1604, an initial coil configuration is provided. In step 1606, the field strengths for the coil configuration is determined. The field strength determination can, for example, be performed in a program such as Maxwell and data for a particular height above the coil configuration can be input, for example, to Excel. In step 1608, a map of the effective field strength for the configuration is determined. In step 1610, the system determines whether the coil configuration has been optimized by determining that there are acceptable efficiencies over the defined area. As discussed above, the efficiencies can be determined by a calibrated graph such as that shown in FIG. 12C. If coil configuration is not yet optimal, a new coil configuration is determined in step 1614 and algorithm 1600 returns to step 1606. If the coil configuration is optimal, algorithm 1600 proceeds to step 1612 where the configuration is provided for production of the optimal coil.

Figure 17:
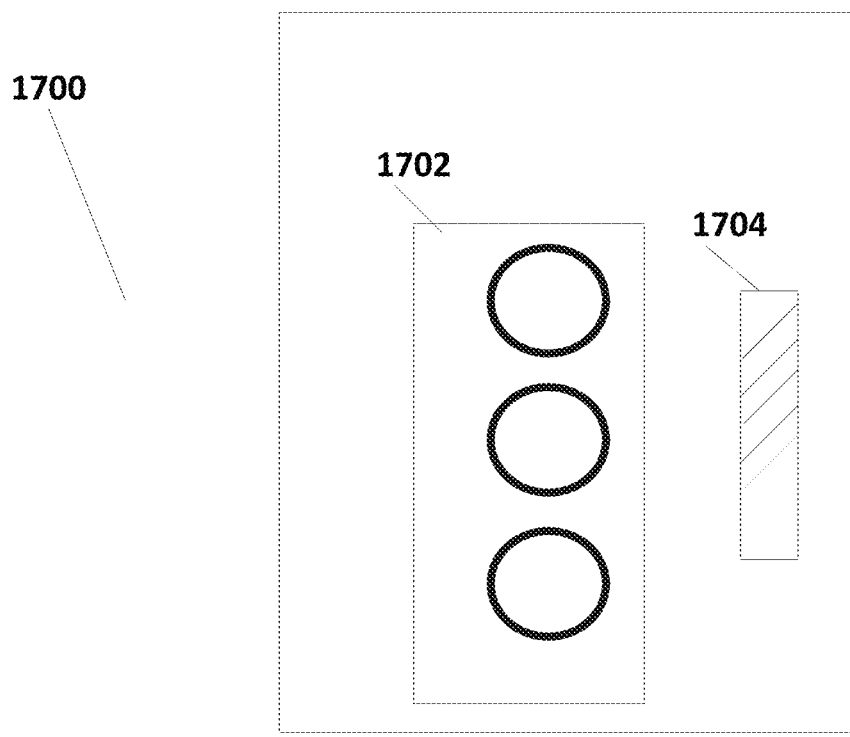
FIG. 17 illustrates a mobile device with coils according to embodiments of the present invention.

FIG. 17 illustrates a device 1700 which includes coils according to embodiments of the present invention. Device 1700 may be a wireless power transmitting device, which may be fixed at a particular location. Alternatively, device 1700 may be a mobile device with wireless power receive coils and potentially transmit coils. As illustrated in FIG. 17, coil arrangements 1702 and 1704 are illustrated. Coil arrangements 1702 and 1704 can be embodiments of coils such as those discussed above.

The above detailed description is provided to illustrate specific embodiments of the present invention and is not intended to be limiting. Numerous variations and modifications within the scope of the present invention are possible. The present invention is set forth in the following claims.

What is claimed is:

1. A coil arrangement, comprising:
   a coil configured to provide a magnetic field in a first area, the magnetic field configured to transmit wireless power or near field communication,
   wherein the at least one coil is further configured to reduce the magnetic field in a second area outside of the first area,
   wherein the coil is a bent solenoid oriented in an X-Y plane, the bent solenoid localizing magnetic field flux in the first area at ends of the bent solenoid while reducing the magnetic field in the second area outside of the first area.

2. The coil of claim 1, wherein the bent solenoid is wound around a ferrite material.

3. The coil of claim 1, further including caps positioned on ends of the bent solenoid, the caps further direct the magnetic field flux into the X-Y plane.

4. The coil of claim 3, wherein the caps are adjusted to control the area of the magnetic field flux.

5. The coil of claim 3, wherein the caps include a top portion and a bottom portion coupled through vias wherein a current is distributed through cap.

6. The coil of claim 1, wherein the at least one coil includes a flattened solenoid with end caps to control the magnetic field flux.

7. The coil of claim 6, wherein the end caps each include a top portion and a bottom portion coupled through vias such that current is distributed through the cap.

8. The coil arrangement of claim 1, wherein the at least one coil includes a configuration of multiple coils, wherein a magnetic field strength at a particular height over the configuration of multiple coils is efficient over a defined area.

9. The coil arrangement of claim 8, wherein efficiency of the configuration of multiple coils is determined by simulating effective field strengths about the coils.

* * * * *